(12) United States Patent
Janik et al.

(10) Patent No.: US 12,501,532 B2
(45) Date of Patent: Dec. 16, 2025

(54) REDUNDANT LIGHTING DRIVER SYSTEM

(71) Applicant: SIGNIFY HOLDING B.V., Eindhoven (NL)

(72) Inventors: Raymond George Janik, Fayetteville, GA (US); Khurram Z Moghal, Senoia, GA (US); Russell Scott Trask, Sharpsburg, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 136 days.

(21) Appl. No.: 18/293,406

(22) PCT Filed: Aug. 1, 2022

(86) PCT No.: PCT/EP2022/071569
§ 371 (c)(1),
(2) Date: Jan. 30, 2024

(87) PCT Pub. No.: WO2023/012113
PCT Pub. Date: Feb. 9, 2023

(65) Prior Publication Data
US 2025/0126694 A1    Apr. 17, 2025

Related U.S. Application Data

(60) Provisional application No. 63/228,744, filed on Aug. 3, 2021.

(30) Foreign Application Priority Data

Aug. 13, 2021  (EP) ..................................... 21191185

(51) Int. Cl.
*H05B 45/30*    (2020.01)
*H05B 45/385*   (2020.01)
(Continued)

(52) U.S. Cl.
CPC ........... *H05B 47/24* (2020.01); *H05B 45/385* (2020.01); *H05B 47/172* (2024.01)

(58) Field of Classification Search
CPC ........ H05B 45/10; H05B 45/30; H05B 45/37; H05B 45/385; H05B 47/10; H05B 47/172; H05B 47/24
See application file for complete search history.

(56) References Cited

U.S. PATENT DOCUMENTS 8,284,536 B2   10/2012   Minarczyk et al.
9,270,143 B1    2/2016   Mangiaracina et al.
(Continued)

FOREIGN PATENT DOCUMENTS

CN      204090254 U    1/2015

*Primary Examiner* — Jimmy T Vu (57) ABSTRACT

A redundant lighting driver system includes a primary driver and a backup driver. The primary driver and the backup driver are electrically coupled to receive an alternating current (AC) power from a power source. The primary driver or the backup driver power a light source at a time. The primary driver is configured to provide a primary power to the light source, and the backup driver is configured to provide a backup power to the light source when the primary power is unavailable. The backup driver is designed to withstand a larger power surge than the primary driver.

7 Claims, 5 Drawing Sheets

(51) Int. Cl.
*H05B 47/17* (2020.01)
*H05B 47/24* (2020.01)

(56) References Cited

U.S. PATENT DOCUMENTS

| | | |
|---|---|---|
| 2011/0103097 A1 | 5/2011 | Wang et al. |
| 2011/0121734 A1 | 5/2011 | Pape |
| 2011/0148318 A1 | 6/2011 | Shackle et al. |
| 2012/0187852 A1* | 7/2012 | Mandy .................. H05B 45/39 |
| | | 315/175 |
| 2013/0162148 A1 | 6/2013 | Huang |
| 2014/0246987 A1 | 9/2014 | Hua et al. |
| 2014/0252948 A1 | 9/2014 | Mandy et al. |
| 2017/0051886 A1 | 2/2017 | Liu et al. |
| 2017/0071051 A1 | 3/2017 | Chen et al. |
| 2017/0163087 A1 | 6/2017 | Dickey |
| 2018/0019615 A1 | 1/2018 | Wilson et al. |
| 2020/0367330 A1 | 11/2020 | Vollmer et al. |

* cited by examiner

REDUNDANT LIGHTING DRIVER SYSTEM

CROSS-REFERENCE TO PRIOR APPLICATIONS

This application is the U.S. National Phase application under 35 U.S.C. § 371 of International Application No. PCT/EP2022/071569, filed on Aug. 1, 2022, which claims the benefit of European patent application Ser. No. 21/191,185.4, filed on Aug. 13, 2021, and U.S. Provisional Application No. 63/228,744, filed on Aug. 3, 2021. These applications are hereby incorporated by reference herein.

TECHNICAL FIELD

The present disclosure relates generally to lighting solutions, and more particularly to redundant lighting driver systems.

BACKGROUND

A driver is often used to provide power to one or more light sources of a lighting device. For example, a light emitting diode (LED) driver may provide power to one or more LED light sources of one or more lighting fixtures. In general, an LED driver may receive AC (alternating-current) power (e.g., mains electricity) and generate DC (direct-current) power that is provided to one or more light sources. It is generally desirable for drivers to have a good power factor and low harmonic distortion for efficient operation. However, a driver of an outdoor or another type of light fixture may be damaged by a power surge that renders the driver unable to provide adequate power to the light fixture. Such damage can render the light fixture unable to provide light. In some cases, a surge protection unit may be placed ahead of or integrated in a driver of a light fixture. However, in general, many surge protection modules protect against a first power surge exposure but are prone to failure due to subsequent power surge(s). In cases where light fixtures are installed in public arenas (e.g., a stadium) as well as other cases, a total light outage can be highly inconvenient. Thus, a solution that enables a light fixture to continue to provide light after a driver of the light fixture is damaged may be desirable.

SUMMARY

The present disclosure relates generally to lighting solutions, and more particularly to redundant lighting driver systems. In an example embodiment, a redundant lighting driver system includes a primary driver and a backup driver. The primary driver and the backup driver are electrically coupled to receive an alternating current (AC) power from a power source. The primary driver or the backup driver power a light source at a time. The primary driver is configured to provide a primary power to the light source, and the backup driver is configured to provide a backup power to the light source when the primary power is unavailable. The backup driver is designed to withstand a larger power surge than the primary driver.

In another example embodiment, a lighting system includes a primary driver and a backup driver, where the primary driver and the backup driver are electrically coupled to receive an alternating current (AC) power from a power source. The lighting system further includes a light source, where the primary driver or the backup driver power the light source at a time. The primary driver is configured to provide a primary power to the light source, and the backup driver is configured to provide a backup power to the light source when the primary power is unavailable. The backup driver is designed to withstand a larger power surge than the primary driver.

These and other aspects, objects, features, and embodiments will be apparent from the following description and the appended claims.

BRIEF DESCRIPTION OF THE FIGURES

Reference will now be made to the accompanying drawings, which are not necessarily drawn to scale, and wherein.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, the same reference numerals used in different drawings may designate like or corresponding but not necessarily identical elements.

DETAILED DESCRIPTION OF THE EXAMPLE EMBODIMENTS

In the following paragraphs, example embodiments will be described in further detail with reference to the figures. In the description, well known components, methods, and/or processing techniques are omitted or briefly described. Furthermore, reference to various feature(s) of the embodiments is not to suggest that all embodiments must include the referenced feature(s).

Figure 1:
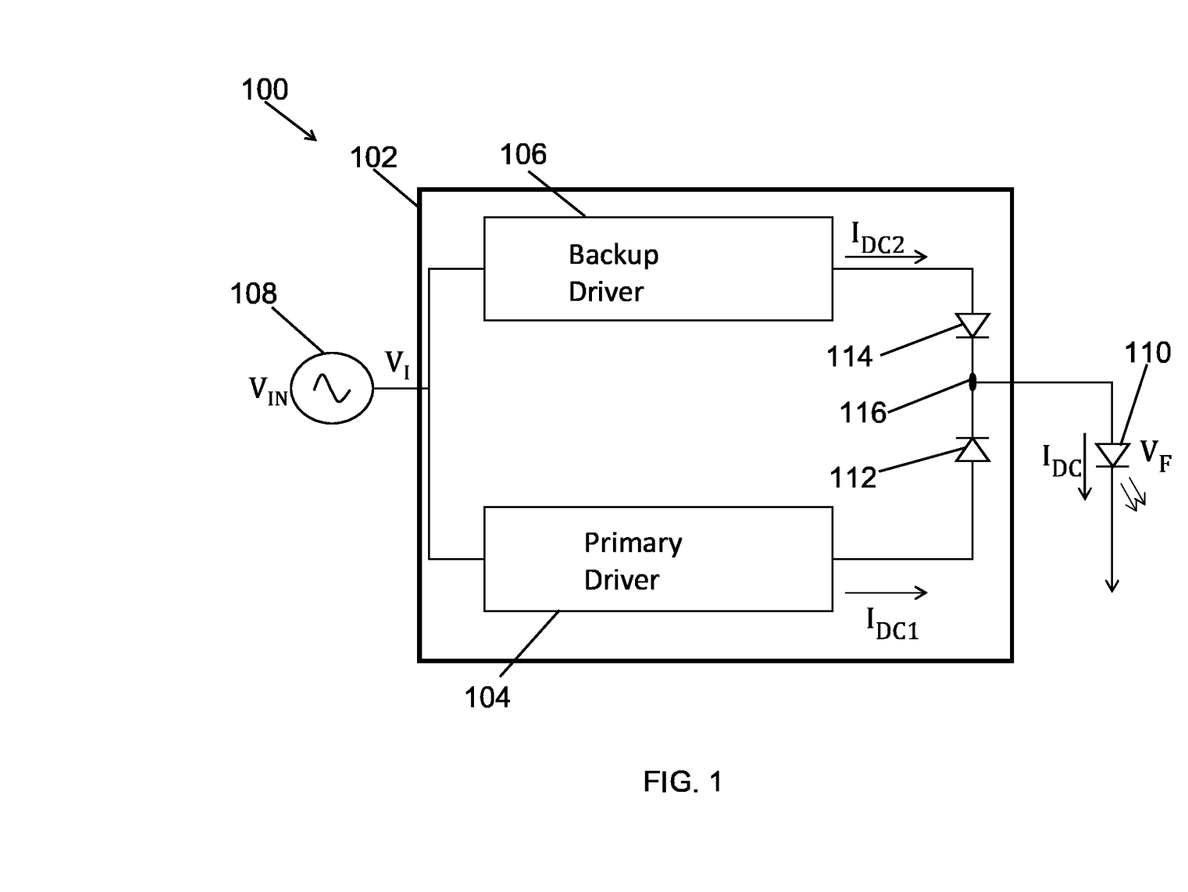
FIG. 1 illustrates a lighting system including a redundant lighting driver system according to an example embodiment.

FIG. 1 illustrates a lighting system 100 including a redundant lighting driver system 102 according to an example embodiment. For example, the lighting system 100 may be an outdoor light fixture 100 that provides an illumination light to an area (e.g., a stadium, a parking lot, etc.) where a light outage is highly inconvenient. As another example, the lighting system 100 may be an indoor light fixture 100 that provides an illumination light to an area such as, for example, an indoor sport arena. In some example embodiments, the lighting system 100 includes the redundant lighting driver system 102 and a light source 110. For example, the light source 110 may be a light emitting diode (LED) light source that includes multiple LEDs having a forward voltage $V_F$ across the LEDs. For example, if the light source 110 has five LEDs that are in a series configuration, the forward voltage $V_F$ may be the total forward voltage across all of the five LEDs. A current $I_{DC}$ provided to the light source 110 by the redundant lighting driver system 102 must be adequate for the light source 110 to emit a light.

In some example embodiments, the redundant lighting driver system 102 receives AC power from an AC source 108 such as a utility or mains power source. For example, the AC power source 108 may provide an AC voltage $V_{IN}$ to the redundant lighting driver system 102. An input voltage $V_I$ that includes the AC voltage $V_{IN}$ may be provided to the redundant lighting driver system 102. For example, the input voltage $V_I$ may include a transient voltage surge that may be introduced in the power line connecting the AC power source 108 and the redundant lighting driver system 102. In general, the transient voltage surge is characterized by a very large voltage spike that lasts for a very short time. For example, a transient voltage surge may have a duration between 10 µs to 1000 µs and may reach a peak voltage of 40 kV (kilovolts) or higher. In general, a transient voltage surge may result from a heavy electrical load switching or from a lightning strike. When no other voltage is introduced in the line connection between the AC power source 108 and the redundant lighting driver system 102, the input voltage $V_I$ is essentially the same as the AC voltage $V_{IN}$.

In some example embodiments, the redundant lighting driver system 102 includes a primary driver 104 and a backup driver 106. The primary driver 104 and the backup driver 106 are both electrically coupled to the AC power source 108. The input voltage $V_I$ that is provided to the redundant lighting driver system 102 is provided to both the primary driver 104 and the backup driver 106. The primary driver 104 is designed to provide a primary power to the light source 110 from the input power $V_I$, and the backup power 106 is designed to provide a backup power to the light source 110 from the input power $V_I$. The redundant lighting driver system 102 is designed such that the backup power is less than the primary power.

To illustrate, the primary driver 104 is designed to provide a primary current $I_{DC1}$ to the light source 110, and the backup driver 106 is designed to provide a backup current $I_{DC2}$ to the light source 110. For example, the primary driver 104 may be a constant current driver designed to provide particular amounts of the current $I_{DC1}$ based on respective levels of the input voltage $V_I$, which is the same as the AC voltage $V_{IN}$ in the absence of an input power surge/transient voltage surge. The redundant lighting driver system 102 is designed such that either the primary driver 104 or the backup driver 106 provides the current $I_{DC}$ to the light source 110 at a time. That is, the primary driver 104 and the backup driver 106 do not provide a power to the light source 110 at the same time, except possibly during transition times when switching between the drivers 104, 106.

In some example embodiments, the redundant lighting driver system 102 may include power diodes 112, 114. The anode of the power diode 112 is coupled to the output of the primary driver 104, and the anode of the power diode 114 is coupled to the output of the backup driver 106. The cathodes of the power diodes 112, 114 are electrically connected to each other, for example, at a node 116, where the current $I_{DC1}$ or the current $I_{DC2}$ is provided to the light source 110 through the node 116 at one time. To illustrate, the current $I_{DC}$ provided to the light source 110 corresponds to the current $I_{DC1}$ provided by the primary driver 104 when the primary driver 104 powers the light source 110. The current $I_{DC}$ corresponds to the current $I_{DC2}$ provided by the backup driver 106 when the backup driver 106 powers the light source 110.

In some example embodiments, the redundant lighting driver system 102 is designed such that the primary driver 104, instead of the backup driver 106, powers the light source 110 when the primary driver 104 is functioning properly. That is, at a particular AC voltage $V_{IN}$ provided to the redundant lighting driver system 102, the current $I_{DC1}$ from the primary driver 104 is greater than the current $I_{DC2}$, which results in the power diode 112 being forward biased and the power diode 114 being reverse biased, where the current $I_{DC}$ through the light source 110 is the current $I_{DC1}$. When the primary driver 104 fails to provide the current $I_{DC1}$ or malfunctions such that the current $I_{DC1}$ is less than the current $I_{DC2}$, the power diode 114 is forward biased and the power diode 112 is reverse biased, where the current $I_{DC}$ through the light source 110 is the current $I_{DC2}$.

In some example embodiments, the primary driver 104 may provide power factor correction, which can increase energy efficiency and reduce electricity costs. The primary driver 104 may also perform current regulation to provide a regulated current to the light source 110. To illustrate, the current $I_{DC1}$ may be a regulated current that does not meaningfully change due to changes to load resulting from the light source 110. The primary driver 104 may also include other components such as a rectifier, an output transformer, etc. as can be readily understood by those of ordinary skill in the art with the benefit of the scope of this disclosure. Different ways of implementing power factor correction, current regulation, and other common functions of the primary driver 104 are well known to those of ordinary skill in the art. To illustrate, the primary driver 104 may be an off-the-shelf constant current driver. In some example embodiments, the primary driver 104 may include a surge protection unit to protect against input power surge that may appear in the input voltage $V_I$ provided to the redundant lighting driver system 102. Alternatively, the primary driver 104 may not include a surge protection unit. In yet some other alternative embodiments, an external surge protection unit may be positioned to provide surge protection to the primary driver 104 as can be readily understood by those of ordinary skill in the art with the benefit of the scope of this disclosure.

In some example embodiments, the backup driver 106 may be designed to include robust surge protection against input power surges. For example, the backup driver 106 includes a surge protection unit to protect against power surges that may appear in the input voltage $V_I$ provided to the redundant lighting driver system 102. To illustrate, even when the primary driver 104 includes a power surge protection unit, the backup driver 106 provides more power surge protection than the primary driver 104. For example, the backup driver 106 may provide protection against higher surge energy and more power surges than the primary driver 104 or a surge protection unit coupled to the primary driver 104.

In some example embodiments, because the main purpose of the backup driver 106 is to provide backup power to the light source 110 until a defective primary driver (e.g., the primary driver 104 that has failed) is repaired or replaced, the backup power provided by the backup driver 106 may be relatively lower quality than the primary power provided by the primary driver 104. For example, the backup driver 106 may not perform power factor correction and/or output current regulation. Excluding such functions from the backup driver 106 may result in the backup driver 106 being robust and having a lower production cost.

Because the backup driver 106 has higher power surge protection than the primary driver 104, the backup driver 106 is designed to provide power to the light source 110 when the primary driver 104 fails due to an input power surge although the primary driver 104 and the backup driver 106 are exposed to the same input power surge. By providing power to the light source 110 using the backup driver 106, the redundant lighting driver system 102 enables the lighting system 100 to continue to provide a light when the primary driver 104 fails or is disabled. The lighting system 100 may to continue to provide a light after the failure of the primary driver 104 while the primary driver 104 is being repaired or replaced.

In some example embodiments, the redundant lighting driver system 102 may provide power to one or more other light sources in addition to the light source 110. In some alternative embodiments, one or more components other than the diodes 112, 114 that enable automatically switching between the primary driver 104 and the backup driver 106 to provide power to the light source 110 may be used without departing from the scope of this disclosure. In some alternative embodiments, the lighting system 100 may include components other than what is shown in FIG. 1 without departing from the scope of this disclosure. In some alternative embodiments, the redundant lighting driver system 102 may include components other than what is shown in FIG. 1 without departing from the scope of this disclosure. In some alternative embodiments, the components of the lighting system 100 may be connected in a different configuration than what is shown without departing from the scope of this disclosure.

Figure 2:
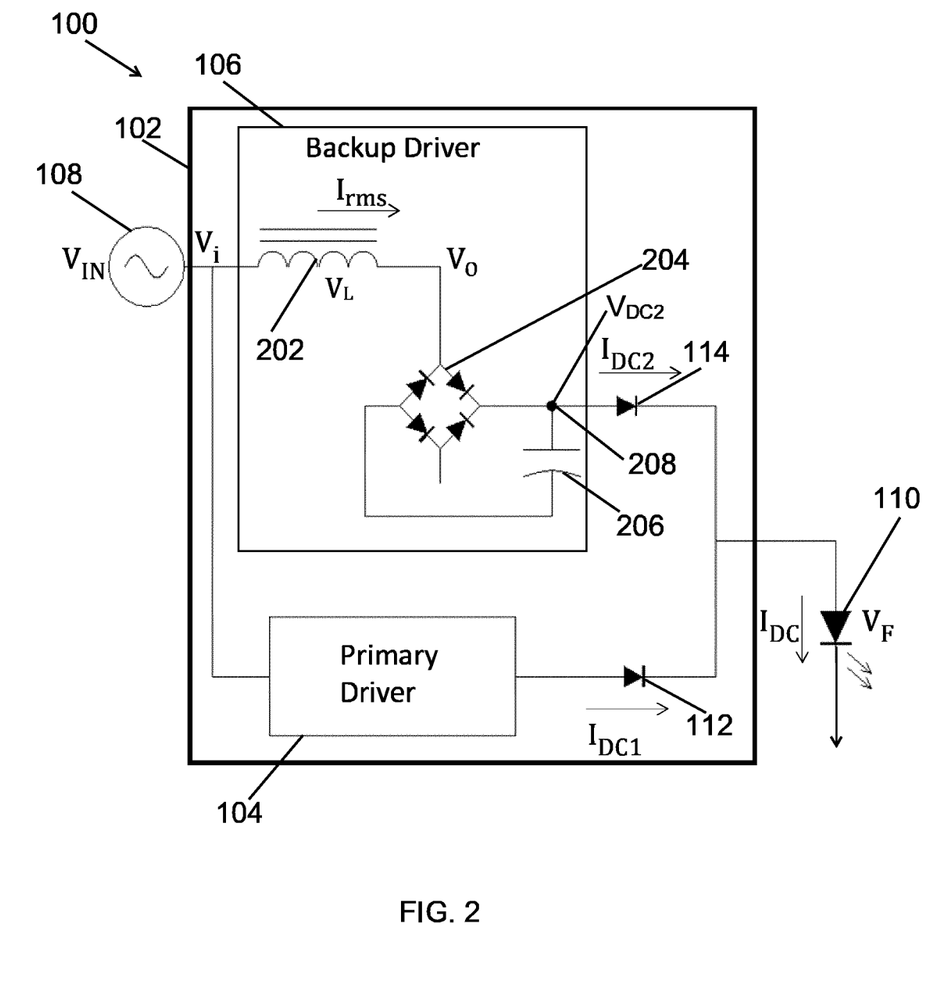
FIG. 2 illustrates the lighting system of FIG. 1 showing some details of the redundant lighting driver system according to an example embodiment.

FIG. 2 illustrates the lighting system 100 of FIG. 1 showing some details of the redundant lighting driver system 102 according to an example embodiment. Referring to FIGS. 1 and 2, in some example embodiments, the backup driver 106 may include an inductor unit 202, a rectifier 204, and a capacitor 206. The inductor unit 202 is electrically coupled to the power source 108 to receive the AC voltage $V_{IN}$ from the power source 108. As indicated above, the input voltage $V_I$ may be essentially the same as the AC voltage $V_{IN}$ when no other voltage is introduced in the line connection between the AC power source 108 and the redundant lighting driver system 102.

In some example embodiments, the inductor unit 202 is also coupled to the rectifier 204. For example, the rectifier 204 may be a bridge rectifier as shown in FIG. 2 or may be another type of rectifier without departing from the scope of this disclosure. The reverse voltage rating of the rectifier 204 may be, for example, 1000 volts. The rectifier 204 may rectify the voltage $V_O$ from the inductor unit 202 as can be readily understood by those of ordinary skill in the art with the benefit of the scope of this disclosure. The rectifier 204 may also be coupled to the capacitor 206. For example, the capacitor 206 may be a direct current (DC) capacitor with a voltage rating of 200% of the forward voltage of the LED(s) of the light source 110. The current $I_{DC2}$ is provided by the backup driver 106 through a node 208 connecting the rectifier 204 and the capacitor 206 as shown in FIG. 2. To illustrate, the node 208 is coupled to the anode of the diode 114 such that the current $I_{DC2}$ is provided to the light source 110 through the diode 114.

In some example embodiments, the inductor unit 202 is designed to have an inductance L that limits the current $I_{DC2}$ from the backup driver 106 to be lower than the current $I_{DC1}$ from the primary driver 104 such that, when the current $I_{DC1}$ is available, the diode 114 is reverse biased and the diode 112 is forward biased. When the current $I_{DC1}$ is unavailable, for example, because the primary driver 104 is damaged by a transient surge in the input voltage $V_I$, the diode 114 becomes forward biased and the diode 112 becomes reverse biased such that the current $I_{DC2}$ is provided to the light source 110.

To illustrate, the voltage $V_O$ between the inductor unit 202 and the rectifier 204 is related to the LED forward voltage of the light source 110 (i.e., the forward voltage of LED(s) of the light source 110). The rms current $I_{rms}$ through the inductor unit 202 is related to the current $I_{DC2}$, which is the same as the current $I_{DC}$ through the light source 110 when the diode 114 is forward biased and the diode 112 is reverse biased. Equation 1 below illustrates the relationship:

$$I_{DC} = \frac{2\sqrt{2}}{\pi} I_{rms} \qquad \text{Equation 1}$$

Equation 2 below shows the relationship between the rms current IMS through the inductor unit 202 and the inductance L of the inductor unit 202:

$$I_{rms} = \frac{V_{IN} - V_O}{2\pi f L} \qquad \text{Equation 2}$$

For the purpose of Equation 2, $V_{IN}-V_O$ represents the voltage $V_L$ across the inductor unit 202, and the AC voltage $V_{IN}$ may be replaced by the input voltage $V_I$ in the absence of a voltage spike/power surge. As can be seen from Equations 1 and 2, the current $I_{DC}$ through the light source 110, which is the same as the current $I_{DC2}$ when the backup driver 106 is powering the light source 110, is a function of the AC voltage $V_{IN}$. For example, the AC voltage $V_{IN}$ may vary between 120 volts to 277 volts. The inductor unit 202 may be designed or selected to have an inductance L that results in the current $I_{DC2}$ being less than the current $I_{DC1}$ provided by the primary driver 202 when the primary driver 202 is functioning properly.

In some example embodiments, the value of the inductance L may be selected/determined with respect to Equations 1 and 2 based on the AC voltage $V_{IN}$ at the maximum level (e.g., 277 volts). An inductive component that has an inductance value determined based on Equations 1 and 2 with the AC voltage $V_{IN}$ set to the maximum level (e.g., 277 volts) may be selected as the inductor unit 202. Although a value of the inductance L selected/determined based on the maximum level of the AC voltage $V_{IN}$ may result in a reduced amount of the current $I_{DC2}$ and a dimmer light when levels of the input voltage $V_{IN}$ are below the maximum level, the reduced amount of the current $I_{DC2}$ can still enable the light source 110 to emit an adequate level of light. By automatically providing power to the light source 110 after an exposure to a power surge that has disabled the primary driver 104, the backup driver 106 enables the lighting system 100 to continue to provide a light.

In some alternative embodiments, the backup driver 106 may include components other than what is shown in FIG. 2 without departing from the scope of this disclosure. In some alternative embodiments, the components of the backup driver 106 may be connected in a different configuration than what is shown without departing from the scope of this disclosure. In some alternative embodiments, the backup driver 106 may be implemented as multiple components without departing from the scope of this disclosure.

Figure 3:
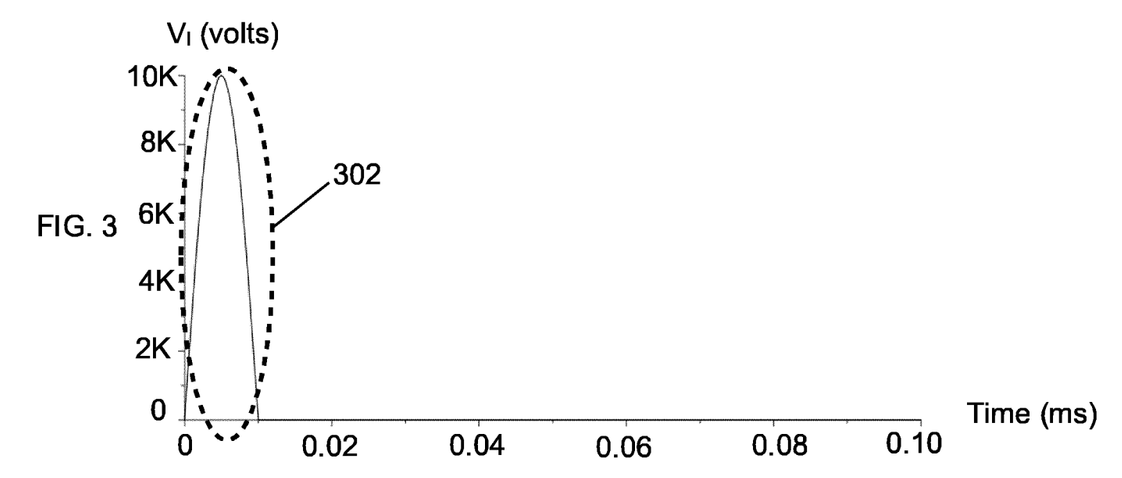
FIG. 3 illustrates a graph of the input voltage at the input of the backup driver of the redundant lighting driver system of FIG. 2 according to an example embodiment.

FIG. 3 illustrates a graph of the input voltage $V_I$ at the input of the backup driver 106 of the redundant lighting driver system 102 of FIG. 2 according to an example embodiment. Referring to FIGS. 1-3, in some example embodiments, the input voltage $V_I$ at the input of the redundant lighting driver system 102, and thus at the input of the backup driver 106, may include a transient voltage surge 302 that is imposed on the AC voltage $V_{IN}$ from the AC power source 108. For example, the transient voltage surge 302 may be a result of a lightning strike that hit the line connection between a municipality power source and the lighting system 100. The input voltage $V_I$ at the inductor unit 202 (e.g., the inductor unit 202 with inductance L of 167 mH at 60 Hz of the AC voltage $V_{IN}$) may reach, for example, approximately 10,000 volts and may have a duration of, for example, approximately 0.01 milliseconds (ms). After the duration of the transient voltage surge 302, the input voltage $V_I$ returns to the level of the AC voltage $V_{IN}$ in a range of approximately 120 volts to 277 volts rms, and the inductor voltage across the inductor unit 202 correspondingly decreases. In FIG. 3, although the input voltage $V_I$ appears to be zero due to the relatively large voltage spike, the amplitude of the input voltage $V_I$ is in a range of approximately 120 volts to 277 volts.

In some alternative embodiments, the peak amplitude of the voltage spike may be more or less than what is shown without departing from the scope of this disclosure. In some alternative embodiments, the duration of the voltage spike may be more or less than what is shown without departing from the scope of this disclosure. In some alternative embodiments, the AC voltage $V_{IN}$ may be in a range that is more than 277 volts or less than 120 volts without departing from the scope of this disclosure.

Figure 4:
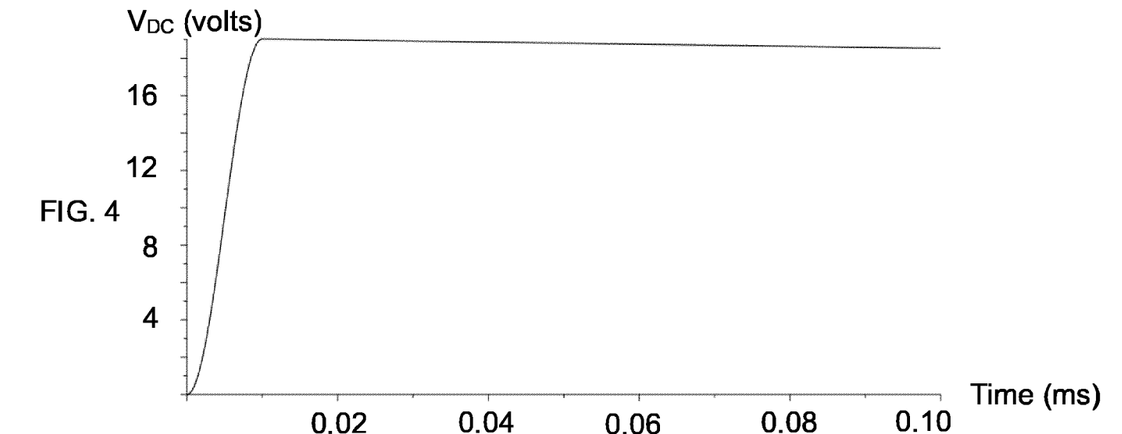
FIG. 4 illustrates a graph of a direct current (DC) voltage that is the increase in the output voltage of the backup driver resulting from the transient voltage surge shown in FIG. 3 according to an example embodiment.

FIG. 4 illustrates a graph of a DC voltage $V_DC$ that is the increase in the output voltage $V_{DC2}$ of the backup driver 106 resulting from the transient voltage surge shown in FIG. 3 according to an example embodiment. In FIG. 4, the graph illustrates the DC voltage $V_{DC}$ when no load is attached to the backup driver 106 (i.e., the open-circuit voltage). Referring to FIGS. 1-4, in some example embodiments, because the inductor unit 202 slows down the energy from the transient voltage surge 302 shown in FIG. 3 from instantaneously reaching the output voltage $V_{DC2}$, the increase in the output voltage $V_{DC2}$ of the backup driver 106, i.e., the DC voltage $V_{DC}$ shown in FIG. 4, is significantly lower than the amplitude of the transient voltage surge 302. For example, as shown in FIG. 4, the DC voltage $V_{DC}$, even with no load attached to the backup driver 106, is about 18.5 volts, which is an acceptable voltage increase in the output voltage $V_{DC2}$ of the backup driver 106 with respect to damage to components, despite the relatively large transient voltage surge 302. When a load (e.g., the light source 110) is attached to the backup driver 106 as shown in FIG. 2, the output voltage $V_{DC2}$ of the backup driver 106 will be clamped by the load (e.g., the diode 114 and the light source 110), and thus limiting the DC voltage $V_DC$. By slowing the increase in the output voltage $V_{DC2}$ of the backup driver 106, the inductor unit 202 can prevent the transient voltage surge 302 from damaging the light source 110 as well as other components of the lighting system 100.

In FIGS. 3 and 4, voltage values and time values are illustrative examples and may have other values (i.e., higher values or lower values) without departing from the scope of this disclosure. In FIG. 4, the forward voltage $V_F$ may settle at a normal operating voltage level at a faster or slower rate than what may be suggested by the graph without departing from the scope of this disclosure.

Figure 5:
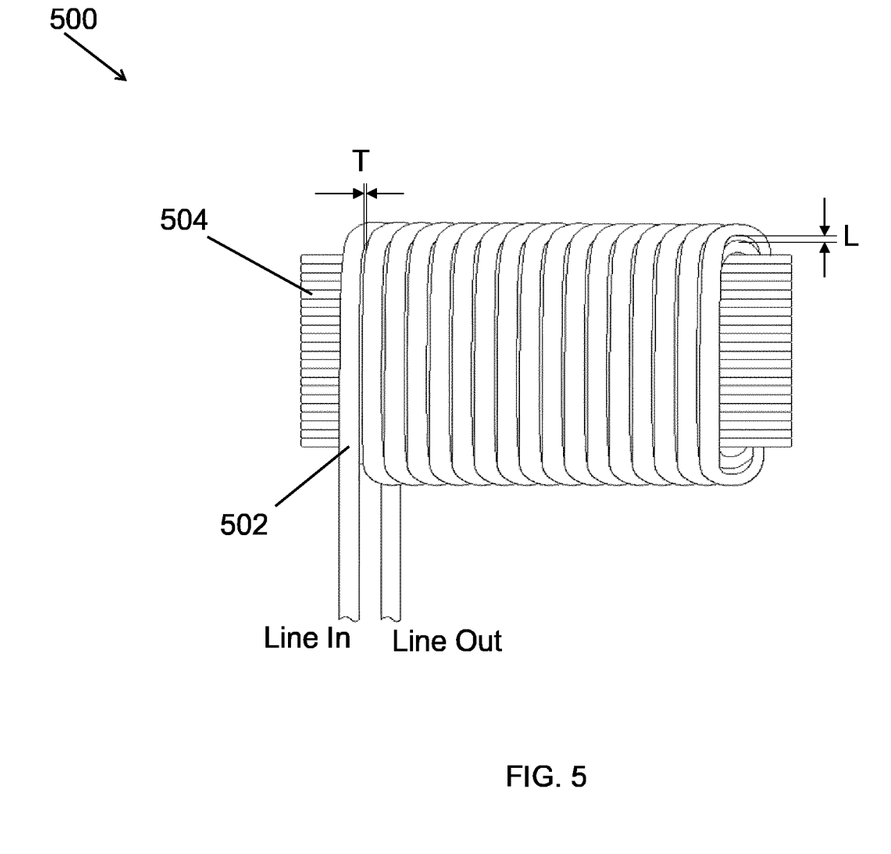
FIG. 5 illustrates an inductor that corresponds to the inductor unit of FIG. 2 according to an example embodiment.

FIG. 5 illustrates an inductor 500 that corresponds to the inductor unit 202 of FIG. 2 according to an example embodiment. For example, the inductance of the inductor 500 is the same as the inductance L of the inductor unit 202. In some example embodiments, the inductor unit 202 includes the inductor 500 as well as other components. Referring to FIGS. 2 and 5, in some example embodiments, the inductor 500 may include a coil 502 that is wound around a magnetic core 504. The turns of the coil 502 may be separated by a turn-to-turn insulator T, and different layers of the coil 502 may be separated by a layer-to-layer insulator. Turn-to-turn insulation and layer-to-layer insulation reduces risk of electrical discharge within the coil 502 that would otherwise lead to failure. Opposite ends of the coil 502 serve as input and output connections of the inductor 500. For example, the input voltage $V_I$ may be provided to the first end Line In, and the voltage $V_O$, shown in FIG. 2, may be available at the other end, Line Out, of the coil 502 and provided to the rectifier 204 shown in FIG. 2. The inductance of the inductor 500 may depend on a number of parameters including the number of turns of the coil 502, dimensions of the coil 502, etc. as readily understood by those of ordinary skill in the art with the benefit of the scope of this disclosure. For example, the inductor 500 may be designed to withstand a transient voltage surge of 40 kV or higher.

In some alternative embodiments, the inductor 500 may have a different structure than what is shown in FIG. 5 without departing from the scope of this disclosure. In some alternative embodiments, the inductor 500 may include other elements without departing from the scope of this disclosure.

Figure 6:
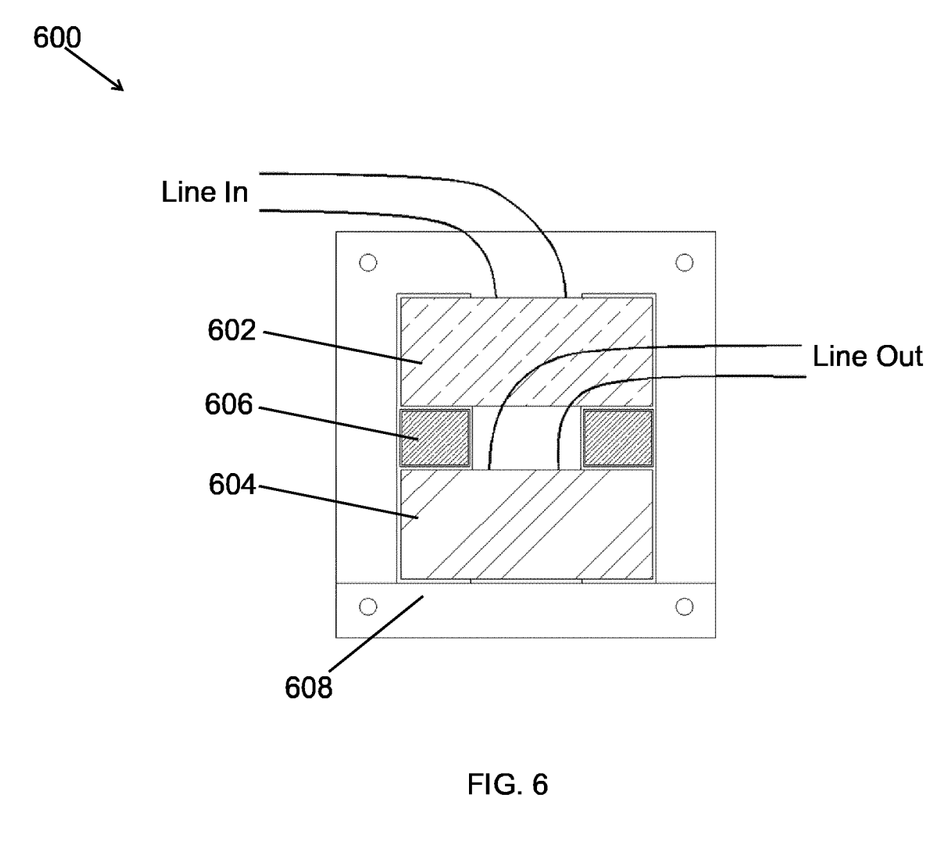
FIG. 6 illustrates a transformer that corresponds to the inductor unit of FIG. 2 according to an example embodiment.

FIG. 6 illustrates a transformer 600 that corresponds to the inductor unit 202 of FIG. 2 according to an example embodiment. For example, the inductance of the transformer 600 is the same as the inductance L of the inductor unit 202. In some example embodiments, the inductor unit 202 includes the transformer 600 as well as other components. Referring to FIGS. 2 and 6, in some example embodiments, the transformer 600 may include a primary coil 602 and a secondary coil 604 that are wound around respective sections of a magnetic core 608. The primary coil 602 and the secondary coil 604 are separated from each other by an air gap that may be partially occupied by an air gap spacer or magnetic shunt 606. The resulting leakage inductance serves as the inductance of the transformer 600. The leakage inductance may depend on a number of factors such as the spacing between the primary coil 602 and the secondary coil 604, the air gap spacer or magnetic shunt 606, etc. as can be readily understood by those of ordinary skill in the art with the benefit of the scope of this disclosure. The input voltage $V_I$ may be provided to the input connection Line In of the primary coil 602 of the transformer 600, and the voltage $V_O$, shown in FIG. 2, may be available at the output connection Line Out of the secondary coil 604 of the transformer 600 and provided to the rectifier 204 shown in FIG. 2.

In some example embodiments, the transformer 600 may be a step-up or a step-down transformer based on the windings of the primary coil 602 and the secondary coil 604 as can be readily understood by those of ordinary skill in the art with the benefit of the scope of this disclosure. In some example embodiments, the transformer 600 may include taps (not shown) for selecting between different input and output voltage relationships as can be readily understood by those of ordinary skill in the art with the benefit of the scope of this disclosure.

In some alternative embodiments, the transformer 600 may have a different structure than what is shown in FIG. 6 without departing from the scope of this disclosure. In some alternative embodiments, the transformer 600 may include other elements without departing from the scope of this disclosure.

Although particular embodiments have been described herein in detail, the descriptions are by way of example. The features of the example embodiments described herein are representative and, in alternative embodiments, certain features, elements, and/or steps may be added or omitted. Additionally, modifications to aspects of the example embodiments described herein may be made by those skilled in the art without departing from the scope of the following claims, the scope of which are to be accorded the broadest interpretation so as to encompass modifications and equivalent structures.

The invention claimed is:

1. A redundant lighting driver system, comprising:
   a primary driver;
   a backup driver, wherein the backup driver includes an inductor unit that limits time varying current, wherein the inductor unit is sized such that both the backup driver withstands a transient surge voltage having a duration less than 1000 μs and an output voltage provided by the backup driver is less than an output voltage provided by the primary driver when powering a light source;
   wherein the primary driver and the backup driver are each configured to receive an alternating current (AC) power from a power source, wherein the inductor unit receives the AC power for the backup driver; and
   wherein the primary driver is configured to provide a primary power to the light source, and wherein the backup driver is configured to provide a backup power to the light source when the primary driver is disabled due to a power surge, wherein the backup power is less than the primary power.

2. The redundant lighting driver system of claim 1, wherein the inductor unit comprises a step-up transformer or a step-down transformer.

3. The redundant lighting driver system of claim 1, wherein the backup driver further comprises a capacitor, and a rectifier.

4. The redundant lighting driver system of claim 3, wherein the rectifier is coupled to the inductor unit and to the capacitor at a node of the backup driver.

5. The redundant lighting driver system of claim 3, wherein the capacitor has a voltage rating that is at least at 200% of a forward voltage of one or more light emitting diodes of the light source.

6. The redundant lighting driver system of claim 1, further comprising: a first diode and a second diode, wherein an anode of the first diode is coupled to the primary driver, wherein an anode of the second diode is coupled to the backup driver, and wherein a cathode of the primary driver and a cathode of the backup driver are coupled to each other at a node designed to be coupled to the light source to provide the primary power or the backup power to the light source, and wherein when the voltage at the anode of the second diode is higher than the voltage at the anode of the first diode, the backup driver provides power to the light source.

7. The redundant lighting driver system of claim 1, wherein the backup driver does not include and is not connected to a battery.

* * * * *